(12) United States Patent
Smith et al.

(10) Patent No.: US 10,046,997 B2
(45) Date of Patent: Aug. 14, 2018

(54) WATER TREATMENT SYSTEM FOR SIMULTANEOUS NITRIFICATION AND DENITRIFICATION

(76) Inventors: Dean Smith, Thousand Oaks, CA (US); Ola Lysenstoen, Newbury Park, CA (US); Cary Tope-McKay, Malibu, CA (US); Gary Gorian, Westlake Village, CA (US)

(*) Notice: Subject to any disclaimer, the term of this patent is extended or adjusted under 35 U.S.C. 154(b) by 197 days.

(21) Appl. No.: 13/315,276

(22) Filed: Dec. 8, 2011

(65) Prior Publication Data

US 2012/0145611 A1  Jun. 14, 2012

Related U.S. Application Data

(60) Provisional application No. 61/421,153, filed on Dec. 8, 2010, provisional application No. 61/497,482, filed on Jun. 15, 2011.

(51) Int. Cl.
*C02F 3/12* (2006.01)
*C02F 9/00* (2006.01)
(Continued)

(52) U.S. Cl.
CPC ............ *C02F 3/301* (2013.01); *C02F 3/302* (2013.01); *C02F 2101/16* (2013.01); *C02F 2101/163* (2013.01)

(58) Field of Classification Search
None
See application file for complete search history.

(56) References Cited

U.S. PATENT DOCUMENTS 4,849,102 A * 7/1989 Latour ................ B01D 63/084
                                                    210/321.64
5,286,385 A * 2/1994 Jorgensen et al. ............ 210/610
(Continued)

FOREIGN PATENT DOCUMENTS

BE          836967        6/1976
GB          1508120 A  *  4/1978  .............. B01J 19/30
(Continued)

OTHER PUBLICATIONS

Fuerhacker et al.—Approach for a Novel Control Strategy for Simultaneous Nitrification/Denitrification in Activated Sludge Reactors, Wat. Res., 34: 9, (2000), p. 2499-2506.*
Qureshi et al.—Biofilm reactors for industrial bioconversion processes: employing potential of enhanced reaction rates, Microbial Cell Factories, (Aug. 25, 2005), 21 pages.*
(Continued)

*Primary Examiner* — Hayden Brewster
(74) *Attorney, Agent, or Firm* — Tope-McKay & Associates

(57) ABSTRACT

Described herein is a water treatment system for simultaneously removing ammonia and nitrates from a liquid. The water treatment system comprises a nitrifying volume for nitrification of a liquid and a denitrifying volume for denitrification of the liquid. One of the nitrifying volume and the denitrifying volume resides substantially within the other of the nitrifying volume and the denitrifying volume, and the nitrifying volume and the denitrifying volume are in fluid communication. In one aspect, the nitrifying volume is a relatively oxygenated region and the denitrifying volume is a relatively oxygen-depleted region. In another aspect, the nitrifying volume is in communication with an oxygen-supplying source for providing oxygen to create the relatively oxygenated region.

6 Claims, 19 Drawing Sheets

(51) Int. Cl.
*C02F 3/30* (2006.01)
*B01D 33/70* (2006.01)
*B01D 33/80* (2006.01)
*B01D 35/00* (2006.01)
*C02F 101/16* (2006.01)

(56) References Cited

U.S. PATENT DOCUMENTS

| | | | |
|---|---|---|---|
| 5,811,259 A * | 9/1998 | Hall | C12M 23/34 210/903 |
| 5,951,860 A * | 9/1999 | Guy | 210/195.1 |
| 6,383,390 B1 | 5/2002 | Van Loosdrecht et al. | |
| 6,743,362 B1 * | 6/2004 | Porteous | C02F 3/1273 210/260 |
| 2002/0070163 A1 | 6/2002 | Lambert | |
| 2002/0163089 A1 * | 11/2002 | La Crosse | 261/76 |
| 2004/0155368 A1 * | 8/2004 | Boulant | B01F 3/04609 261/91 |
| 2005/0040107 A1 * | 2/2005 | Kasparian et al. | 210/636 |
| 2007/0205152 A1 | 9/2007 | Jell et al. | |
| 2007/0218537 A1 | 9/2007 | Furukawa et al. | |
| 2007/0227970 A1 * | 10/2007 | Wickham | 210/605 |
| 2008/0053898 A1 * | 3/2008 | Durda et al. | 210/615 |
| 2008/0264860 A1 * | 10/2008 | Smith | B01D 63/04 210/620 |
| 2009/0023019 A1 * | 1/2009 | Koenekamp | H01M 8/04141 429/410 |
| 2010/0170846 A1 | 7/2010 | Durda et al. | |
| 2010/0264080 A1 | 10/2010 | Livingston et al. | |
| 2011/0068057 A1 * | 3/2011 | Haley, III | C02F 3/006 210/619 |
| 2011/0186513 A1 * | 8/2011 | Vuong | B01D 61/04 210/636 |

FOREIGN PATENT DOCUMENTS

| | | |
|---|---|---|
| JP | 58-055097 | 4/1983 |
| JP | H11277091 | 10/1999 |
| JP | 2004 230259 | 8/2004 |
| WO | WO2009151190 | 12/2009 |

OTHER PUBLICATIONS

International Preliminary Report on Patentability and The Written Opinion of the International Searching Authority for PCT/US2011/001969.
Harter, T. and Lund, J.R., "Addressing Nitrate in California's Drinking Water," Center for Watershed Sciences, UC Davis Report for the SWRCB SBX2 1, Groundwater Nitrate Project, Implementation of Senate Bill X2 1 Prepared for California State Water Resources Control Board, Mar. 2012.
Stein, L. and Arp, D.J., "Loss of Ammonia Monooxygenase Activity in Nitrosomonas europaea upon Exposure to Nitrite," Applied and Environmental Microbiology, Oct. 1998, p. 4098-4102.
Wett, B., "Inexpensive Denitrification via Sidestream Treatment by Deammonification with anemmox bacteria," Environmental Technology, www.m2ttech.com/pdfs/DEMON%20BROCHURE.pdf.
Vanotti, M.S., et al., "Treatment of High-Ammonia Animal Wastewater with Nitrifying Pellets," Paper No. 99/4092, An ASAE Meeting Presentation, Written for Presentation at the 1999 ASAE/CSAE Annual International Meeting Sponsored by ASAE, Toronto, Ontario, Canada, Jul. 18-21, 1999.
"Stable High rate Ammonia Removal Over Nitrite (SHARON) N-Removal Over Nitrite," Grontmij Nederland BV. Dept. Water & Energy, De Bill, 2007.
Jensen, V.B. et al, "Drinking Water Tratment for Nitrate," Technical Report 6, in: Addressing Nitrate in California's Drinking Water with a Focus on Tulare Lake Basin and Salinas Valley Groundwater, Report for California State Water Resources Control Board to the Legislature, Center for Watershed Sciences, University of California, Davis, Mar. 2012.
PCT International Preliminary Report on Patentability and The Written Opinion of the International Searching Authority for PCT/US2012/000206.
Supplementary European Search Report for EP 12 80 1066, date of completion of the search Jan. 9, 2015.
Further Examination Report from the European Patent Office for EP 12 80 1066, dated Aug. 24, 2016.
Response to Further Examination Report from the European Patent Office for EP 12 80 1066, dated Jun. 8, 2017.
English translation of JP2004 230259 as provided by the European Patent Office JP2004 230259. dated Dec. 8, 2016.

* cited by examiner

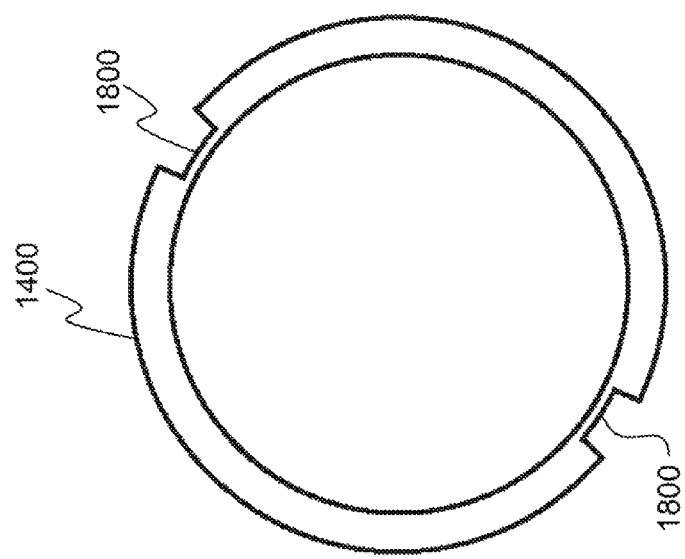
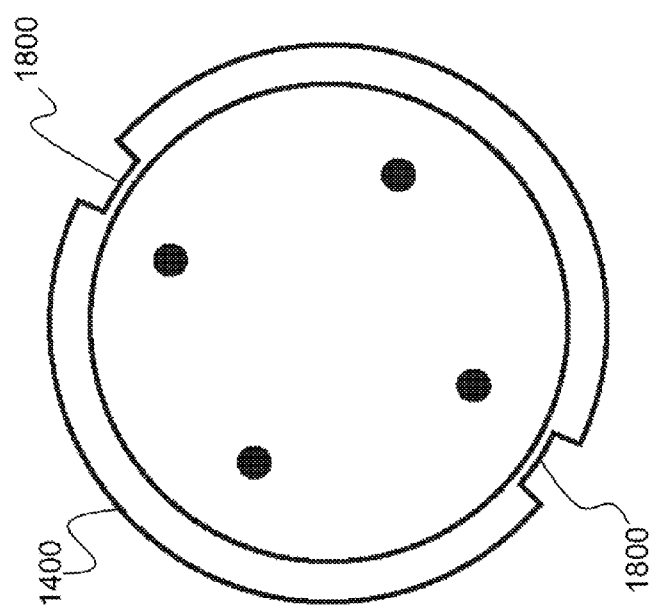

WATER TREATMENT SYSTEM FOR SIMULTANEOUS NITRIFICATION AND DENITRIFICATION

PRIORITY CLAIM

The present application is a Non-Provisional patent application of U.S. Provisional Patent Application No. 61/421,153, filed Dec. 8, 2010, entitled "Self-Contained Anoxic Device" and U.S. Provisional Patent Application No. 61/497,482, filed Jun. 15, 2011, entitled, "Water Treatment System for Simultaneous Nitrification and Denitrification."

BACKGROUND OF THE INVENTION (1) Field of Invention

The present invention relates to a water treatment system and, more particularly, to a water treatment system for simultaneous nitrification and denitrification.

(2) Description of Related Art

Water treatment, also referred to as sewage treatment, involves removing contaminants from wastewater and household sewage. Several processes are used to remove physical, chemical, and biological contaminants. Typically, a water treatment system utilizes three stages: primary, secondary, and tertiary treatment. Primary treatment involves containing the sewage to allow heavy solids to settle at the bottom of a basin, while oil, grease, and lighter solids float to the top. The liquid that remains after removal of the settled and floating materials is then subjected to a secondary treatment. The secondary treatment consists of removing dissolved and suspended biological matter using microorganisms (e.g., bacteria, protozoans). Finally, tertiary treatment is considered any further treatment of the water which improves the quality of the water prior to discharge to the receiving environment, such as disinfection.

One significant objective in secondary treatment is the reduction of nitrates, which are toxic and must be kept at low levels in accordance with the Environmental Protection Agency (EPA). Additionally, it is important to reduce ammonia levels during water treatment. The removal of nitrogen occurs through the biological oxidation of nitrogen from ammonia, or nitrification, followed by denitrification, which is the reduction of nitrate to nitrogen gas. Ammonia conversion generally occurs under aerobic conditions, while nitrate conversion generally occurs under anoxic/low oxygen conditions. In some cases, however, conversion of ammonia can also occur under anaerobic conditions. Nitrification itself is a two-step aerobic process, each step facilitated by a different type of bacteria. Denitrification generally requires anoxic conditions to encourage the appropriate biological communities to form and is facilitated by a wide diversity of bacteria. Currently, water treatment systems have separate aerobic and anoxic zones, or regions, in aeration basins for ammonia and nitrate conversion, respectively.

Thus, a continuing need exists for a cost-efficient water treatment system which serves the dual purpose of reducing ammonia and nitrate levels in water using a single device.

SUMMARY OF INVENTION

The present invention relates to a water treatment system and, more particularly, to a water treatment system for simultaneous nitrification and denitrification. The system comprises a nitrifying volume for nitrification of a liquid and a denitrifying volume for denitrification of the liquid. One of the nitrifying volume and the denitrifying volume resides substantially within the other of the nitrifying volume and the denitrifying volume, and the nitrifying volume and the denitrifying volume are in fluid communication.

In another aspect, the nitrifying volume is a relatively oxygenated region and the denitrifying volume is a relatively oxygen-depleted region.

In another aspect, the nitrifying volume is in communication with an oxygen-supplying source for providing oxygen to create the relatively oxygenated region.

In another aspect, the oxygen-supplying source is an air-diffuser.

In another aspect, the one of the nitrifying volume and the denitrifying volume is a fluid body having a bottom, where the liquid in the fluid body has a top surface, and where the other of the nitrifying volume and denitrifying volume resides substantially in the fluid body and comprises at least one columnar unit, where the columnar unit is substantially fixed with regard to at least one of the bottom of the fluid body and the top surface of the liquid.

In another aspect, the columnar unit is a columnar tube having at least one aperture therein, allowing fluid inside the columnar tube to be in communication with fluid outside the columnar tube.

In another aspect, the columnar unit includes an outer sheath having a plurality of apertures therein, the outer sheath being moveable with respect to the columnar unit such that selected apertures in the outer sheath align with the at least one aperture in the columnar unit, thereby creating at least one selectable through-aperture through which fluid inside the columnar tube is in communication with fluid outside the columnar tube.

In another aspect, the outer sheath further includes a floatation device which allows for the selection of the at least one through-aperture based on the level of the top surface of the liquid in the fluid body.

In another aspect, the columnar unit is divided into a plurality of sub-volume compartments.

In another aspect, at least a one of the plurality of sub-volume compartments is in fluid communication with another of the plurality of sub-volume compartments.

In another aspect, the de-nitrifying volume comprises at least one free-moving container with at least one aperture therein to allow for fluid communication between fluid inside the free-moving container and the fluid in the fluid body.

In another aspect, the at least one free-moving container is a hollow, enclosed chamber.

In another aspect, the at least one free-moving container comprises an exterior region, an interior region, and at least one rotational element for imparting a spin effect to the at least one free-moving container.

In another aspect, the at least one rotational element is a protrusion extending from at least one of the exterior region and the interior region.

In another aspect, the at least one rotational element is a groove.

In another aspect, the at least one free-moving container comprises a removably connected cap.

In another aspect, at least one free-moving container is divided into a plurality of sub-volume compartments.

In another aspect, at least one of the plurality of sub-volume compartments is in fluid communication with another the plurality of sub-volume compartments.

In another aspect, at least one pump is employed to augment the flow of fluid from one region to another.

In another aspect, at least one pump is employed to augment the flow within one or both of the regions.

BRIEF DESCRIPTION OF THE DRAWINGS

The objects, features and advantages of the present invention will be apparent from the following detailed descriptions of the various aspects of the invention in conjunction with reference to the following drawings, where:

FIG. 18A is a side-view illustration of an anoxic tumbler comprising a plurality of apertures and indentations according to the present invention;

FIG. 18B is a side-view illustration of an anoxic tumbler comprising a plurality of indentations without apertures according to the present invention.

DETAILED DESCRIPTION

Figure 1:
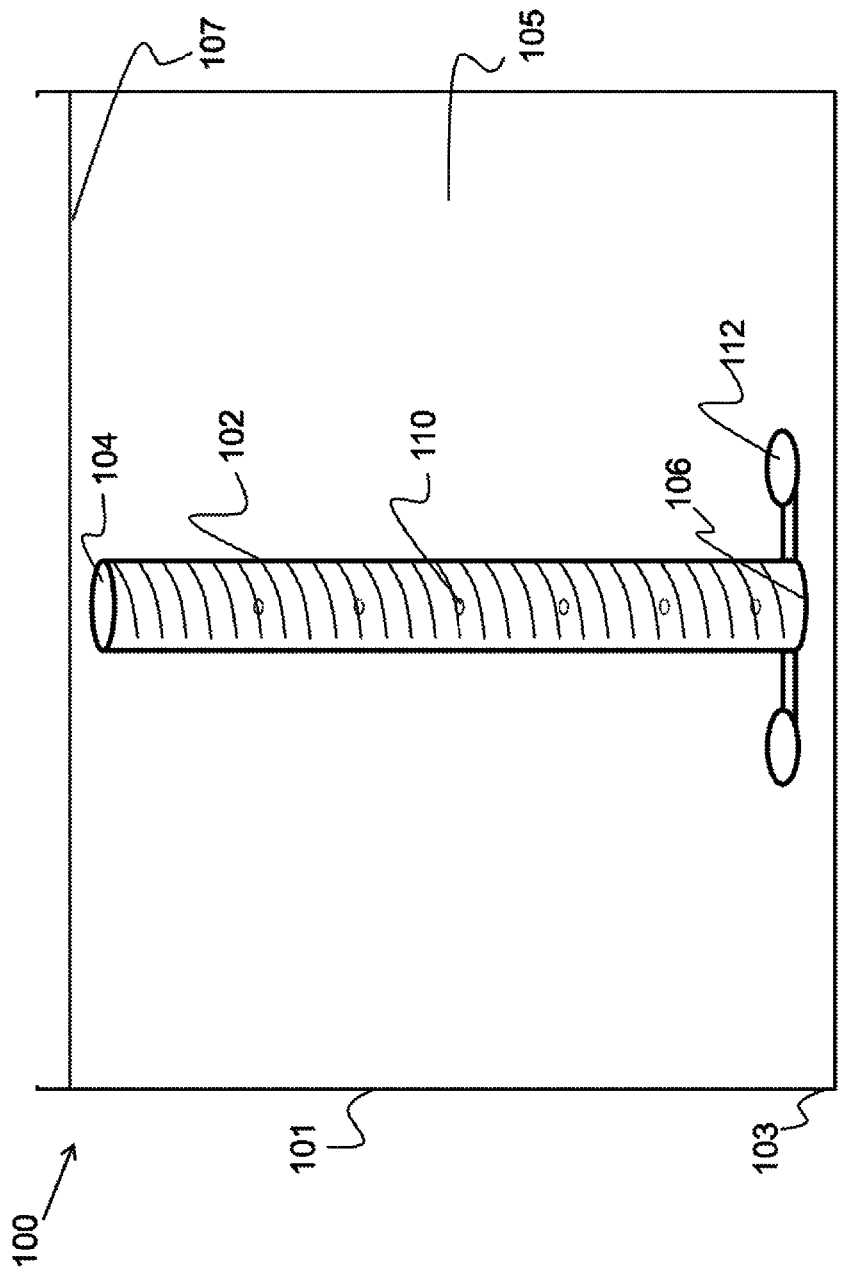
FIG. 1 illustrates a water system according to the present invention.

The present invention relates to a water treatment system and, more particularly, to a water treatment system for simultaneous nitrification and denitrification. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Specific Details

The present invention relates to a device which can be used to simultaneously decrease levels of ammonia and nitrates in a water treatment system. Nitrogen removal is a step in the secondary treatment stage of water treatment. The removal of nitrogen occurs through the biological oxidation of nitrogen from ammonia, or nitrification, followed by denitrification, which is the reduction of nitrate to nitrogen gas. Ammonia conversion occurs under aerobic conditions, while nitrate conversion occurs under anoxic conditions. Nitrification itself is a two-step aerobic process, each step facilitated by a different type of bacteria. Denitrification requires anoxic conditions to encourage the appropriate biological communities to form. It is facilitated by a wide diversity of bacteria.

Currently, water treatment systems have separate aerobic and anoxic tanks (or basins) or the tanks (or basins) are divided into zones for ammonia and nitrate conversion, respectively. Additionally, basins may also be divided into zones alternating between aerobic and anoxic states. The system comprises a nitrifying volume for nitrification of a liquid and a denitrifying volume for denitrification of the liquid. One of the nitrifying volume and the denitrifying volume resides substantially within the other of the nitrifying volume and the denitrifying volume, which will be hereinafter referred to as the inner volume. Furthermore, the nitrifying volume and the denitrifying volume are in bi-directional fluid communication, whereby fluid is able to flow freely through apertures in the inner volume to the outer volume and, in accordance with prevailing conditions, vice-versa. The nitrifying volume is a relatively oxygenated (i.e., aerobic) region, and the denitrifying volume is a relatively oxygen-depleted (i.e., anoxic) region.

In one aspect, the water treatment system functions on the principle of counter-current exchange which, along with convection and diffusion, allows for the reduction of ammonia and a reduction of nitrate to take place simultaneously. However, the water treatment system can also function without counter-current exchange. Countercurrent exchange, along with convection and diffusion, allows for the reduction of ammonia and a reduction of nitrate to take place. In the present invention, the water treatment system can create an anoxic environment in the inner volume, for example, and an aerobic environment on the outside of the inner volume (i.e., outer volume). Alternatively, the water treatment system can create an anoxic environment on the outside of the inner volume (i.e., outer volume) and an aerobic environment inside the inner volume.

In the aerobic environment, ammonia is oxidized to hydroxylamine via ammonia monooxygenase. Hydroxylamine is then converted to nitrite by another oxydizing enzyme called hydroxylamine oxidoreductase. Nitrite is then oxidized to nitrate by yet another oxidizing enzyme. The process of ammonia being converted into nitrate is known as the nitrifying process and is generally done in the presence of oxygen (i.e., an aerobic region). However, the buildup of the intermediate molecules, particularly nitrite, is inhibitory on the activity of ammonia monooygenase. Therefore, the oxidation of ammonia to nitrate via these enzymes causes problems with the reaction. Thus, an anoxic environment, such as that produced by the water treatment system, is beneficial in that it will "pull" the reaction forward so that the intermediate molecules do not accumulate.

As the ammonia concentration falls in the aerobic environment and the hydroxylamine, nitrite and nitrate concentrations rise in the aerobic environment, the reaction slows. For instance, high nitrates in an aerobic region outside the inner volume diffuse inside the inner volume where the nitrate concentration is low. Then, in the interior anoxic region, the nitrates are eventually broken down into nitrogen gas. Therefore, the water treatment system described herein aids in preventing the build-up of intermediate molecules (e.g., nitrite), which are toxic or inhibit the total reaction in the aerobic region. With two microenvironments in close proximity, the reaction runs smoothly without the excessive build-up of intermediate molecules, such as nitrite.

The water treatment system described creates an anoxic environment and an aerobic environment within a single fluid body (e.g., tank, basin) that is more pixelated and, thus, more effective. Pixelation, in the context of the present application, refers to the "resolution" of the process. Similar to how improved resolution in a photograph allows one's eyes to make out finer detail, the smaller the inner volume (e.g., anoxic tumblers, columnar units), or container, described in the present application, the better the reaction works. This is because mixing requirements drop, airflow requirements drop, and the reaction speeds up as a result of ever smaller and more numerous anoxic space.

In experimental studies, the present invention has been used to treat belt press filtrate effluent as opposed to traditional secondary treatment fluids. However, the present invention can also be used to treat traditional secondary treatment fluids. Specifically, the water treatment system has been used to treat wastewater that is significantly higher in ammonia content than secondary water. Levels of $NH_3$ in belt pressate or centrate effluent can range from several milligrams/liter (mg/L) to several grams/liter (g/L), whereas $NH_3$ levels of secondary treatment fluids typically range from 1 mg/L to 50 mg/L. Furthermore, the present invention is useful in the treatment of numerous other wastewater applications within industrial wastewater, landfill leachate, agricultural run-off, aquaculture (e.g., fish farms), and any other wastewater process where there is a high level of ammonia in the influent. In addition to use in wastewater treatment systems described above, the water treatment system described herein is also suitable for use within commercial water treatment facilities, non-limiting examples of which include poultry processing, breweries, canneries, and juice makers.

FIG. 1 is an illustration of one embodiment of the water treatment system 100. One of the nitrifying volume and the denitrifying volume is a fluid body 101 having a bottom 103, where the liquid 105 in the fluid body 101 has a top surface 107. The other of the nitrifying volume and denitrifying volume resides substantially in the fluid body 101 and comprises at least one columnar unit 102, where the columnar unit 102 is substantially fixed with regard to at least one of the bottom 103 of the fluid body 101 and the top surface 107 of the liquid 105. The columnar unit 102 includes a top portion 104, a bottom portion 106, and a surface that extends between the top portion 104 and the bottom portion 106. As a non-limiting example, FIG. 1 depicts a columnar tube. However, as can be appreciated by one skilled in the art, the nitrifying/denitrifying volume which resides within the fluid body 101 (i.e., inner volume) may be configured as a box, tumbler, multiple fluidly-connected but separated spaces, rectangular enclosure, octagonal enclosure, hexagonal enclosure, or any other suitable form, provided that it produces the intended function. Thus, the term "columnar unit" is used hereinafter as a non-limiting example of the nitrifying/denitrifying volume that resides substantially within the other nitrifying/denitrifying volume The columnar unit 102 shown in FIG. 1 includes a fairly flat top portion 104 and bottom portion 106. However, the columnar unit 102 may also be formed in a more hydrodynamic shape which would allow the columnar unit to move more freely within the fluid, if desired. As a non-limiting example, the columnar unit 102 member may be in the shape of a football or fin-like shape. In one aspect, the columnar unit 102 is hollow. The bottom portion 106 and the top portion 104 of the columnar unit 102 may be open, closed, or semi-closed depending on the intended use. Furthermore, the columnar unit 102 may include a bottom cap (or plug) connected with the bottom portion 106 and/or a top cap (or plug) connected with the top portion 104.

The columnar unit 102 (e.g. columnar tuber) comprises at least one aperture 110 therein, allowing fluid inside the columnar unit 102 to be in communication with fluid outside the columnar unit 102. In one aspect, and as shown in FIG. 1, the columnar unit comprises a plurality of apertures 110 positioned at various locations along the surface 108. As can be appreciated by one skilled in the art, the apertures 110 can be formed of any suitable shape, provided that the apertures 100 allow the flow of fluid into and out of columnar unit 102. Additionally, one of skill in the art should recognize the general sense in the prescription that the apertures 110 should adhere to a size range that doesn't fall below 3 mm in most cases. The reason for this pertains to the tendency of such apertures to accrue bacterial 'flock,' which tends to clog the apertures and render them incapable of passaging fluid at sizes smaller than 3 mm. Additionally, the apertures 110 can be positioned at any location along the surface of the columnar unit 102. For instance, the apertures 110 may be positioned only at the top and bottom, only on a side, front and back, etc. In one aspect, the apertures 110 may include a curved protrusion, or lip, that extends slightly over the top of the apertures 110 (i.e., a small extension of the surface) to catch bubbles that are going up. Alternatively, the apertures 110 may include a curved protrusion that extends below the apertures 110 to avoid entry of bubbles. Any combination of lip types (i.e., above or below an aperture 110) or apertures 110 without lips can be utilized.

The columnar unit 102 may further comprise at least one anchoring element 112 for anchoring of the columnar unit 102 to a surface (e.g., bottom, wall) of the fluid body 101 (e.g., tank, basin). The anchoring element 112 maintains the columnar unit 102 in a desired orientation (e.g., vertical) when it is attached to a surface of the fluid body 101 (i.e., bottom of a tank). The anchoring element 112 can maintain the columnar unit 102 at any preferred angle (e.g., 90 degrees, 45 degrees) relative to a surface or wall of the fluid body 101. FIG. 1 depicts the anchoring element 112 attached with the bottom portion 106; however, the anchoring element 112 may be connected with any portion of the columnar unit 102 (e.g., surface, top portion) provided that it maintains the columnar unit 102 in the desired position.

The columnar unit 102 can be anchored to the bottom 103 of the fluid body 101 or at any desired location within the fluid body 101, and can extend to any elevation within the fluid body 101, including above the top surface 107 of the liquid 105 in the fluid body 101. Additionally, an anchoring element 112 may be attached with the top portion 104 of the columnar unit 102. Furthermore, multiple anchoring elements 112 may be utilized (i.e., connected at the top portion 104 and the bottom portion 106) or a single anchoring element 112 may be used. In another aspect, the columnar unit 102 may lack an anchoring element altogether and be free-floating within the fluid body 101 or include a flotation device, as described in detail below.

Figure 2:
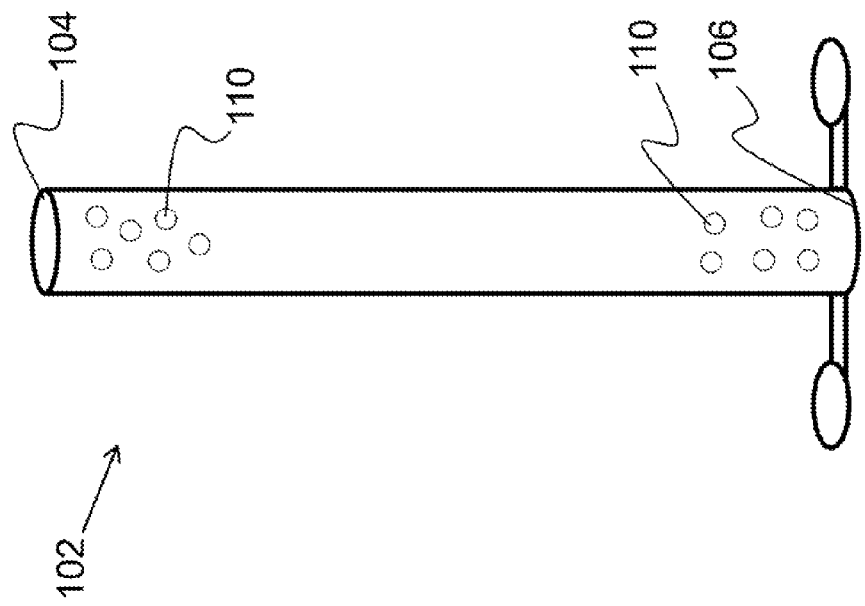
FIG. 2 illustrates a columnar unit with a plurality of apertures concentrated at the top portion and the bottom portion according to the present invention.

FIG. 2 depicts another embodiment of the columnar unit 102, wherein the apertures 110 are concentrated toward the top portion 104 and bottom portion 106 of the columnar unit 102.

Figure 3:
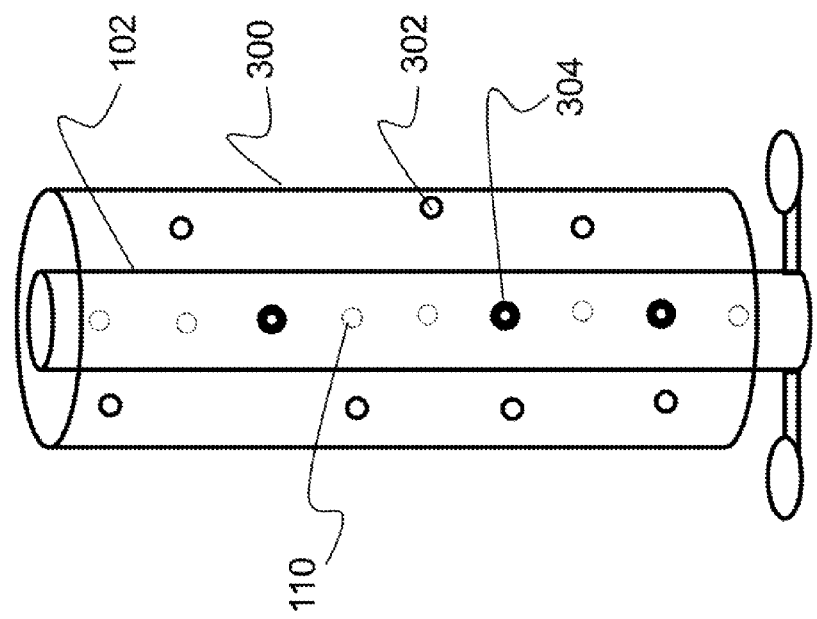
FIG. 3 illustrates a columnar unit with an outer sheath having a plurality of apertures according to the present invention.

FIG. 3 is an illustration of another embodiment of the columnar unit 102 where the columnar unit 102 includes an outer sheath 300 having a plurality of apertures 302 therein. The outer sheath 300 is movable with respect to the columnar unit 102 such that selected apertures 302 in the outer sheath 300 align with the at least one aperture 110 in the columnar unit 102, thereby creating at least one selectable through-aperture 304 through which fluid inside the columnar unit 102 is in communication with fluid outside the columnar unit 102. As the outer sheath 300 changes position (e.g., up and down, around), the apertures 302 align with the apertures 110 in the columnar unit 102, resulting in at least one through-aperture 304. The advantage of "shuttering" the apertures 110 in this fashion is to allow a longer anoxic period.

Figure 4:
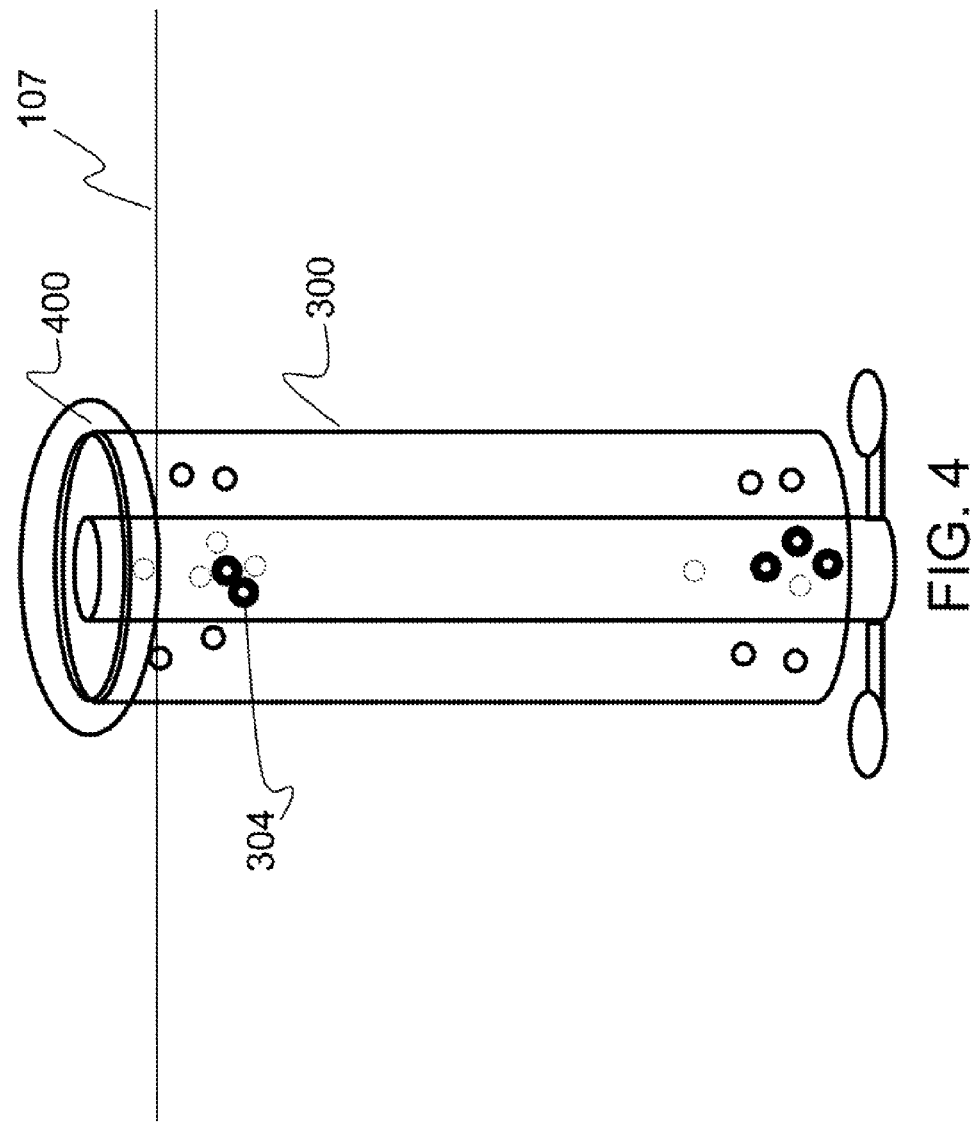
FIG. 4 illustrates a columnar unit with an outer sheath having a flotation device according to the present invention.
Figure 5:
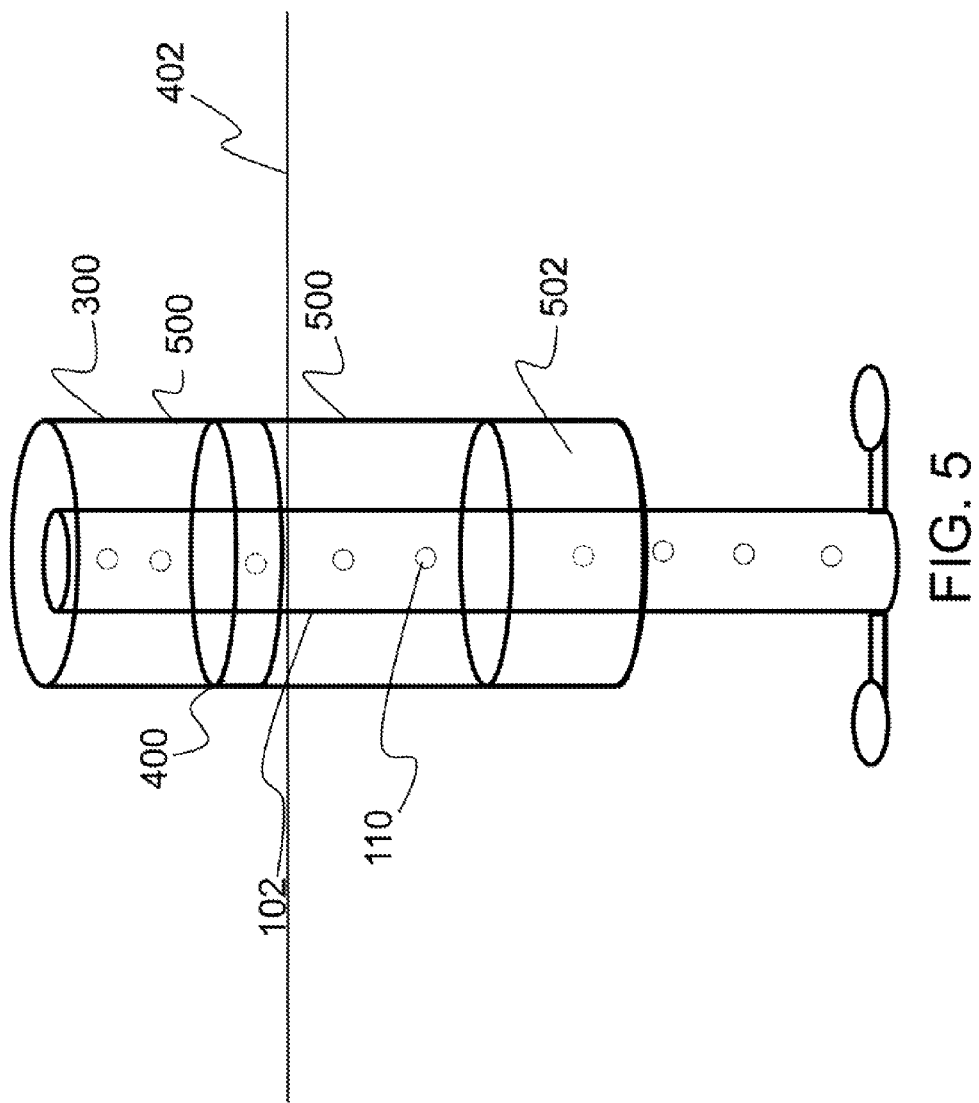
FIG. 5 illustrates a columnar unit with an outer sheath having exposed portions and concealed portions according to the present invention.

As shown in FIG. 4, the outer sheath 300 may include a flotation device 400 which allows for the selection of the at least one through-aperture 304 based on the level of the top surface 107 of the liquid in the fluid body. For instance, the outer sheath 300 may allow for adjustments for tidal effects as the top surface 107 rises and falls. FIG. 5 depicts an additional embodiment of the outer sheath 300, which includes portions that allow for selective exposure of the apertures 110 in the columnar unit 102. For instance, the outer sheath 300 may include at least one exposure portion 500 for exposing the apertures 110 in the columnar unit and at least one concealed portion 502 for concealing the apertures 110. As the top surface 107 rises and falls, so too does the flotation device 400, thereby allowing selective exposure of the apertures 110 in the columnar unit 102.

Figure 6:
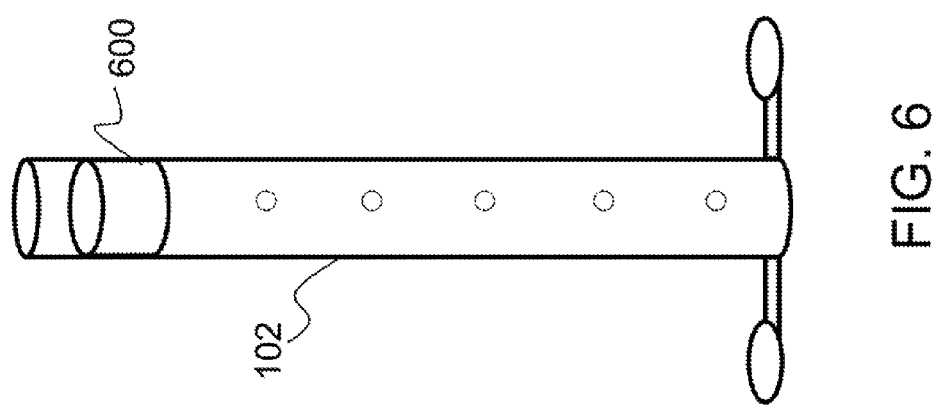
FIG. 6 illustrates a flotation element within the columnar unit according to the present invention.

FIG. 6 illustrates an additional embodiment of the columnar unit 102 which include a flotation element 600 inside the columnar unit 102. The flotation element 600 can be used to prevent air from coming in contact with the liquid inside (i.e., below the flotation element 600) the columnar unit 102. The flotation element 600 can also function as a cap, thus not letting water from waves or tidal movement into the columnar unit 102.

Figure 7:
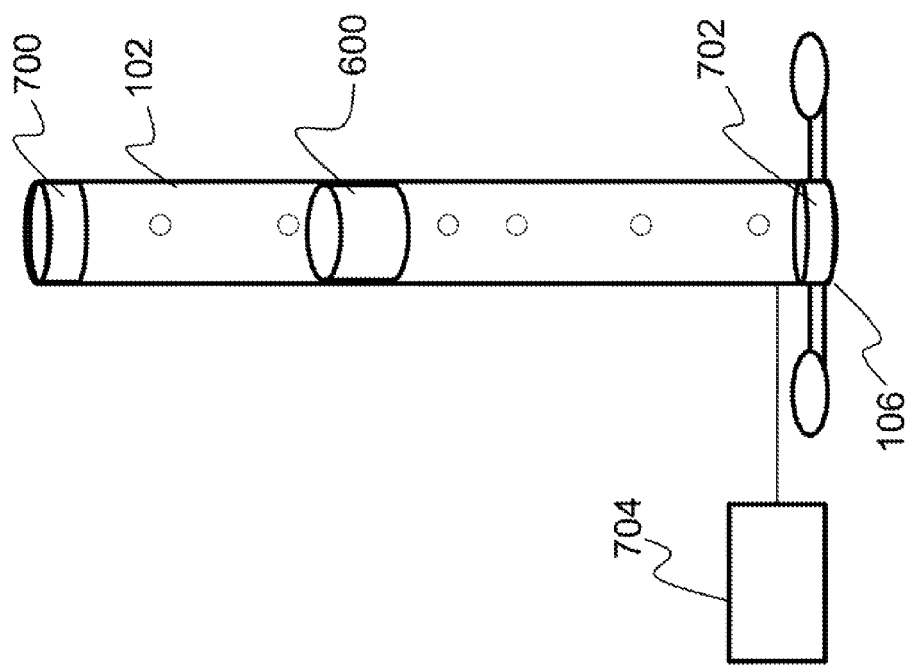
FIG. 7 illustrates a columnar unit with a top cap, a bottom cap, a flotation element within the columnar unit, and a pumping mechanism attached with the columnar unit according to the present invention.

As shown in FIG. 7, another embodiment of the columnar unit 102 includes a top cap 700, a bottom cap 702, and a flotation element 600 inside the columnar unit 102. In this embodiment, at least one pumping mechanism 704 for pumping water or gas is included, and the flotation element 600 can be used to hydraulically or pneumatically force water in or out of the columnar unit 102. The pumping mechanism 704 may be connected with any portion of the water system, either at its interior or exterior. In one aspect, at least one pump is employed to augment the flow of fluid from one region to another (e.g, between a columnar unit and the fluid body). In another aspect, at least one pump is employed to augment the flow within one or both of the regions.

Figure 8:
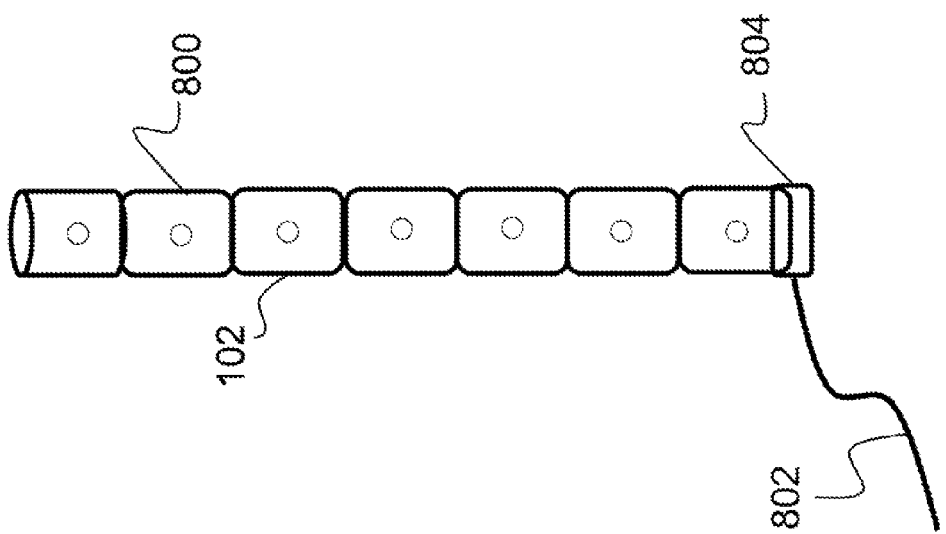
FIG. 8 illustrates a columnar unit divided into sub-volume compartments according to the present invention.
Figure 9:
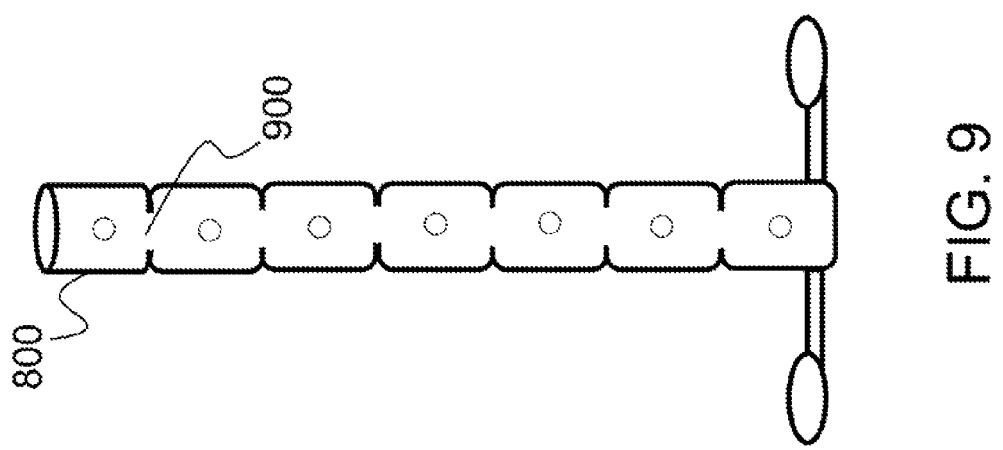
FIG. 9 illustrates a columnar unit divided into sub-volume compartments with at least one aperture according to the present invention.

FIG. 8 depicts yet another embodiment of the columnar unit 102, wherein the columnar unit 102 is divided into a plurality of sub-volume compartments 800. Furthermore, FIG. 8 illustrates another embodiment of the anchoring element, wherein the anchoring element is a string 802 attached with a weight 804. In this aspect, the string 802 can be attached with a surface (e.g., bottom, wall) of a fluid body to maintain the columnar unit 102 in a desired orientation within the fluid body. In an additional embodiment, and as shown in FIG. 9, at least one of the plurality of sub-volume compartments 800 is in fluid communication with another of the plurality of sub-volume compartments 800 through at least one opening 900 between at least two sub-volume compartments 800. Each of the embodiments depicted in FIGS. 8 and 9 may aid in regulating the rate of vertical flow.

In a desired aspect, the nitrifying volume of the water treatment system is in communication with an oxygen-supplying source for providing oxygen to create the relatively oxygenated region. As a non-limiting example, the oxygen-supplying source is an air diffuser. An air diffuser (or membrane diffuser) is an aeration device used to transfer air and oxygen into sewage or industrial wastewater. As can be appreciated by one skilled in the art, other aeration devices can be used, such as a floating air mixer or a venturi pump.

Further, the water system may include mechanisms for measuring the pH level, dissolved oxygen (DO) level, and/or temperature of the fluid either inside, outside, or a combination of inside and outside of the water system using sensors connected with the water system. Additionally, the water system can act as a pH buffer. Selective use of electrolysis can be used to alter the local pH. Chemicals and/or gases can be injected in the top of the inner volume (e.g., columnar unit) as desired. Organisms can also be injected into the inner volume to refresh or enhance the flora that is present. Furthermore, the present invention may include heating and/or cooling mechanisms for changing the temperature of the fluid inside the water treatment system.

Figure 10:
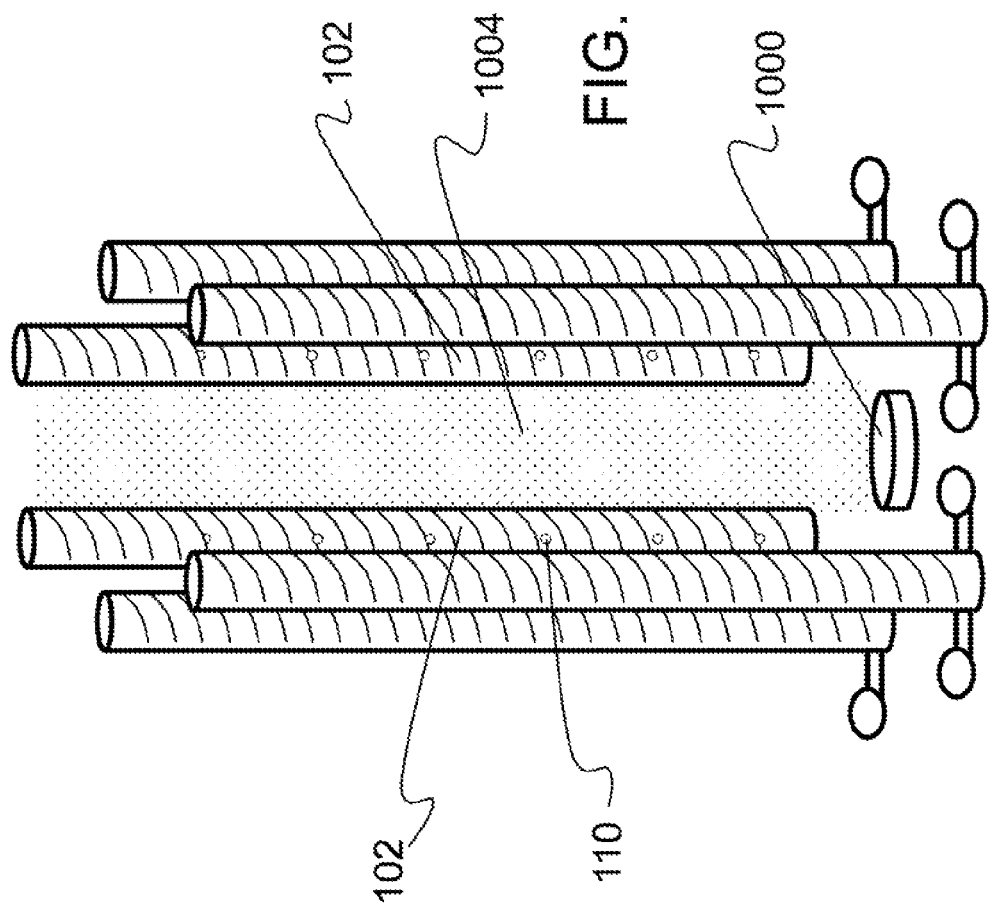
FIG. 10 illustrates an example arrangement of columnar units surrounding an air diffuser according to the present invention.

In a preferred aspect, and as shown in FIG. 10, a plurality of columnar units 102 are fastened in a fluid body in a pattern surrounding an air diffuser 1000, such as a fine-bubble air diffuser or a course bubble diffuser. This arrangement takes advantage of the upward current created by the rising air bubbles 1004, such that the wastewater in the fluid body (e.g., tank) is allowed to flow into the apertures 110 of the columnar unit 102 located on the sides of the columnar units 102 facing the air diffuser 1000 (i.e., inward facing side). As the rising wastewater flows into the columnar units 102, the direction of flow changes to a downward flow inside the columnar units 102.

Figure 11:
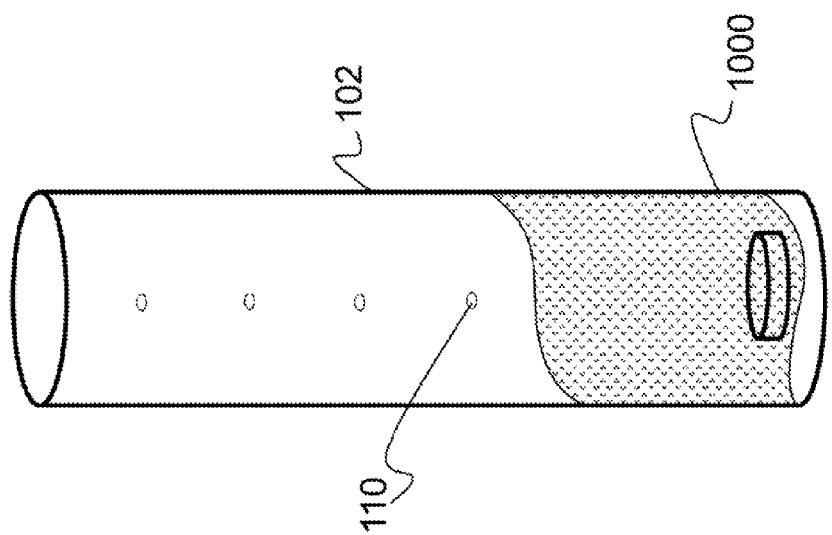
FIG. 11 illustrates a columnar unit with an air diffuser according to the present invention.

In another aspect, and as shown in FIG. 11, the columnar unit 102 is of sufficient size to surround a means of aeration such as an air diffuser 1000, where the columnar unit 102 acts to differentiate an aerated fluid from an anaerobic fluidic zone. This configuration can be thought of as a chimney sitting on top of the air diffuser 1000, fluidly coupled with the surrounding anaerobic zone through the apertures 110 in the columnar unit 102. In addition, this configuration may include a pumping mechanism for mixing of anaerobic fluid with the aerobic fluid inside the columnar unit 102. The fluid may be pumped from outside to inside, inside to inside, or inside to outside for the purpose of mixing or fluid exchange. This particular configuration allows an accelerated ammonia reduction and may allow a larger overall volume of anaerobic space, which is beneficial in energy cost and may facilitate better denitrification.

Figure 12:
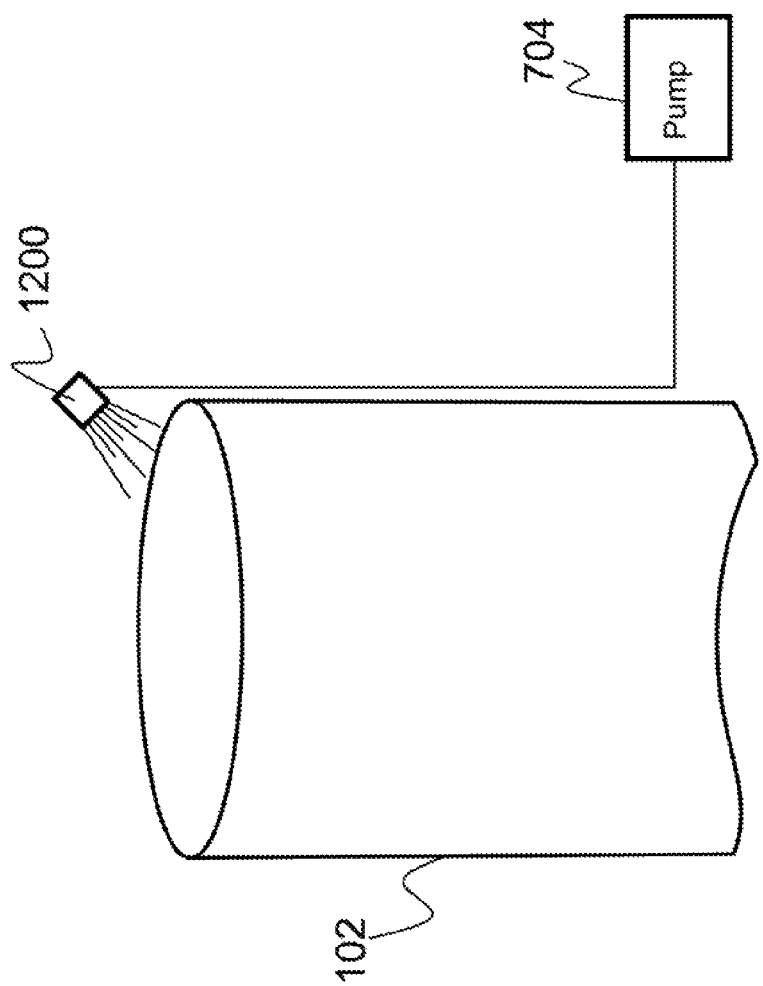
FIG. 12 illustrates a columnar unit with a spray mechanism according to the present invention.

FIG. 12 depicts a columnar unit 102 with a connected spray mechanism 1200 and pumping mechanism 704.

Figure 13:
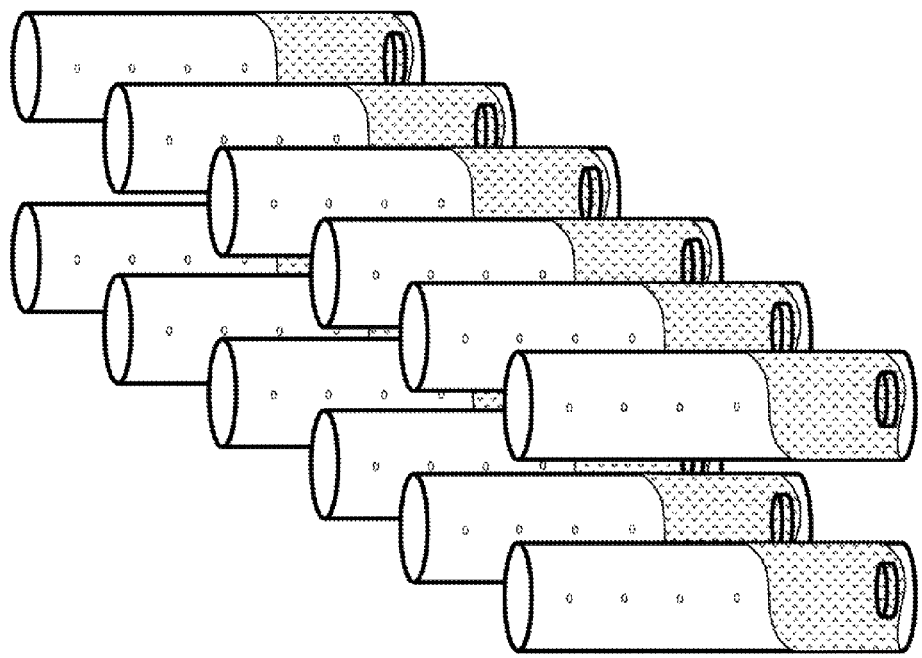
FIG. 13 illustrates an example arrangement of columnar units according to the present invention.

FIG. 13 depicts an example arrangement of a plurality of columnar units.

While the present invention has been primarily depicted as including a columnar unit attached with a fluid body, it should be appreciated that a multitude of alternative embodiments are possible. In one aspect, the denitrifying volume comprises at least one free-moving container with at least one aperture therein to allow for fluid communication between fluid inside the free-moving container and the fluid in the fluid body. The at least one free-moving container may be divided into a plurality of sub-volume compartments. Additionally, at least a one of the plurality of sub-volume compartments may be in fluid communication with another of the plurality of sub-volume compartments. The free-moving container and fluid body may be formed in any suitable size and shape.

Figure 14:
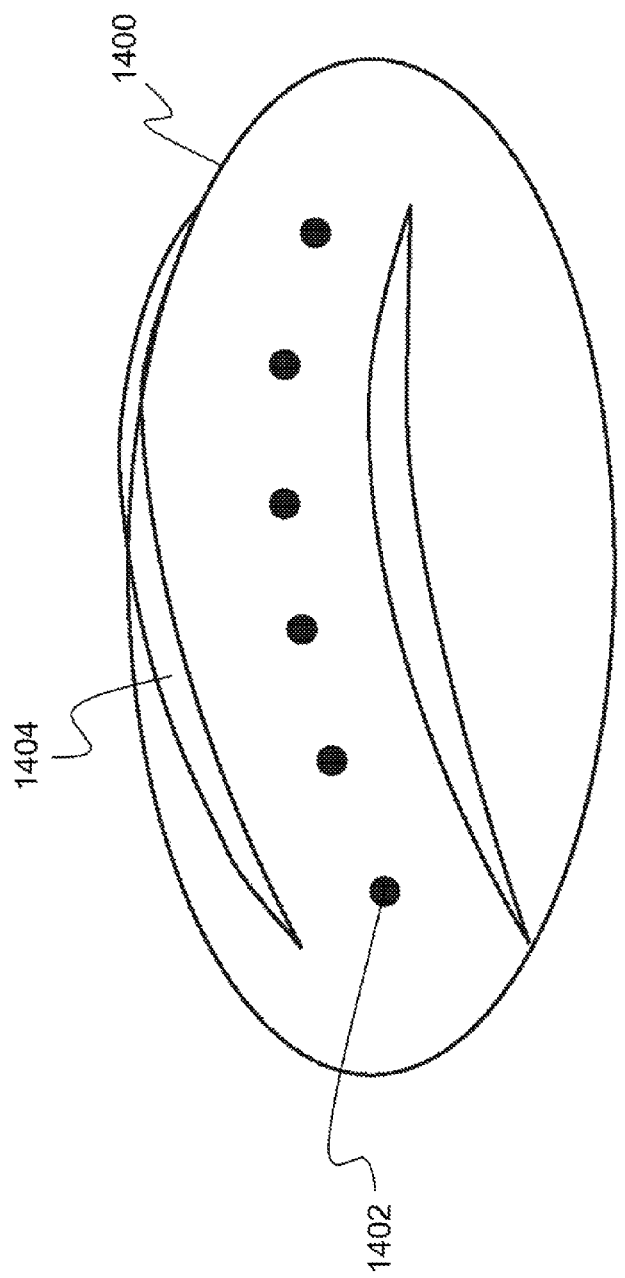
FIG. 14 is a front-view illustration of an anoxic tumbler with protrusions according to the present invention.

FIG. 14 is a front-view illustration of the present invention, depicted as a free-moving container, hereinafter referred to as an "anoxic tumbler." An enclosed chamber 1400 of the anoxic tumbler is hollow, having an interior region and an exterior region. The enclosed chamber 1400 has at least one aperture 1402 therein. In one aspect, and as shown in FIG. 14, the enclosed chamber 1400 comprises a plurality of apertures 1402 positioned at various locations of the enclosed chamber 1400. As can be appreciated by one skilled in the art, the apertures 1402 can be formed of any suitable size and shape provided that the apertures 1402 allow for the flow of water into and out of the enclosed chamber 1400.

In one aspect, the anoxic tumbler further comprises at least one rotational element connected with the enclosed chamber 1400. As a non-limiting example, the rotational element is at least one protrusion 1404 that extends from the enclosed chamber 1400. The purpose of the at least one rotational element is to impart a spin effect which causes the anoxic tumbler to spin in the water. As a non-limiting example, the at least one protrusion 1404 is fin-shaped, as shown in FIG. 14. However, as can be appreciated by one skilled in the art, the rotational element may be any suitable size or shape, and in any suitable arrangement on the enclosed chamber 1400, which produces a spinning action in the anoxic tumbler.

Figure 15:
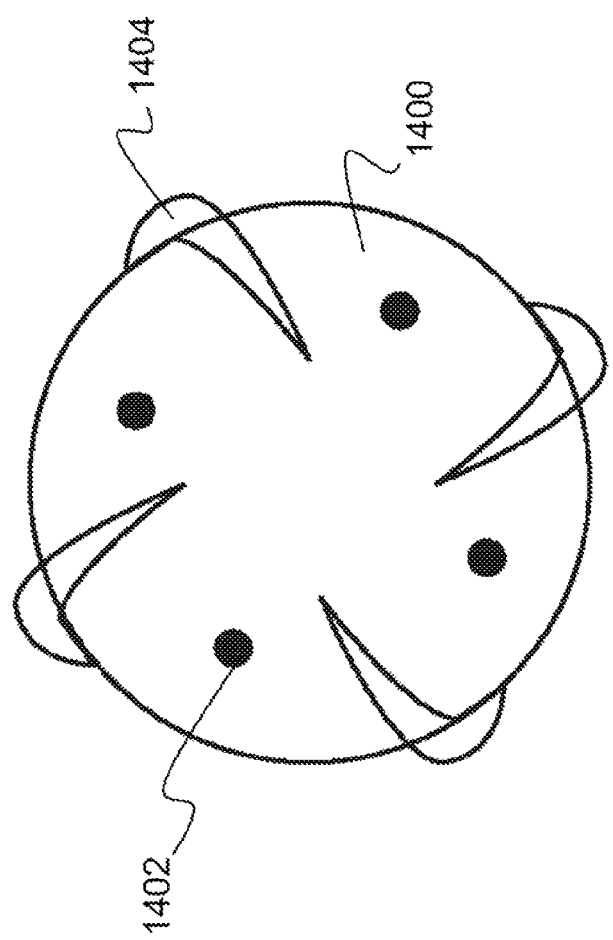
FIG. 15 is a side-view illustration of a anoxic tumbler with protrusions according to the present invention.
Figure 16:
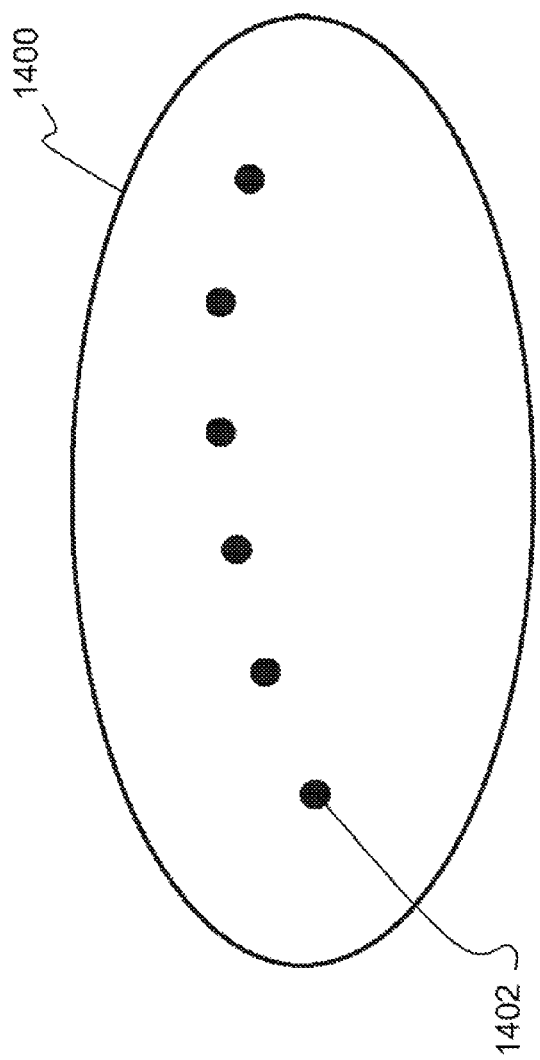
FIG. 16 is a front-view illustration of an anoxic tumbler without protrusions according to the present invention.

FIG. 15 depicts a side-view illustration of one of the sides of the anoxic tumbler. As shown, the enclosed chamber 1400 comprises a plurality of apertures 1402 and protrusions 1404 which wrap around the side of the enclosed chamber 1400. FIG. 16 illustrates an alternative embodiment of the anoxic tumbler, wherein the enclosed chamber 1400 comprises a plurality of apertures 1402 without protrusions.

Figure 17A:
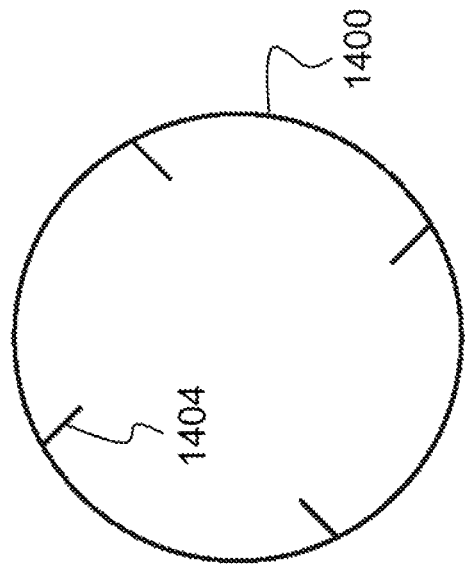
FIG. 17A is a cross-sectional, side-view illustration of an anoxic tumbler depicting protrusions extending from the exterior region according to the present invention.
Figure 17B:
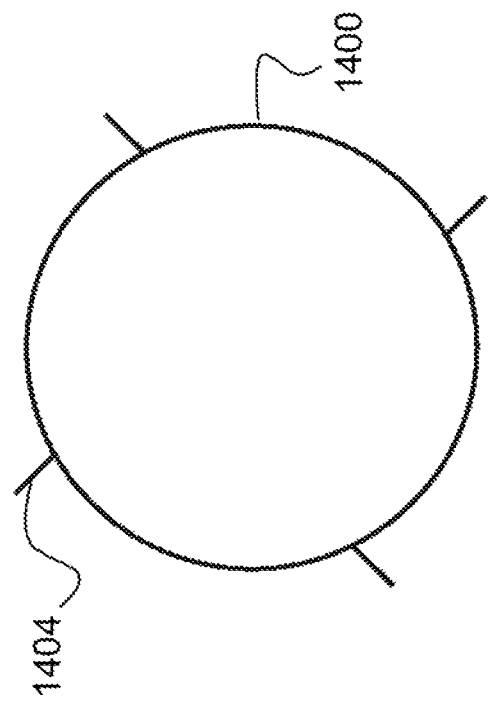
FIG. 17B is a cross-sectional, side-view illustration of an anoxic tumbler depicting protrusions extending from the interior region according to the present invention.

FIGS. 17A and 17B are illustrations of side, cross-sectional views of the anoxic tumbler. In one aspect, and as shown in FIG. 17A, at least one protrusion 1404 may extend from the exterior region of the enclosed chamber 1400. FIG. 17B depicts another aspect where at least one protrusion 1404 extends from the interior region of the enclosed chamber 1400. The protrusion 1404 in the interior region agitates the solution inside the enclosed chamber 1400 to get complete mixing. In another aspect, the anoxic tumbler may comprise a combination of protrusions extending from the exterior and interior regions of the enclosed chamber 1400.

In addition to using protrusions to induce rotation in the anoxic tumbler, various types of other rotational elements may be used. Non-limiting examples include rifling, which is the process of making helical grooves in an object to impart a spin, spiraling indentations, wings, spiraled ridges, and any suitable means of inducing rotation due to the eddy currents/rising airstream in an aeration basin. FIG. 18A illustrates a side-view of an anoxic tumbler comprising indentations 1800 in the enclosed chamber 1400 and a plurality of apertures 1404 positioned at the side end. FIG. 18A depicts a side-view of an anoxic tumbler comprising indentations 1800 in the enclosed chamber 1400 without apertures at the side end.

In the embodiment illustrated, the enclosed chamber portion of the anoxic tumbler comprises a cylindrical body and two pointed edges, similar to a football in shape. However, as can be appreciated by one skilled in the art, the enclosed chamber may be any suitable size or shape provided that it serves its intended purpose. For instance, the enclosed chamber may comprise square or rectangular shaped bodies that can be affixed or anchored to the structure of the aeration basin. These bodies can be filled or partially filled with rocks or other suitable media for anoxic bacterial growth.

Figure 19:
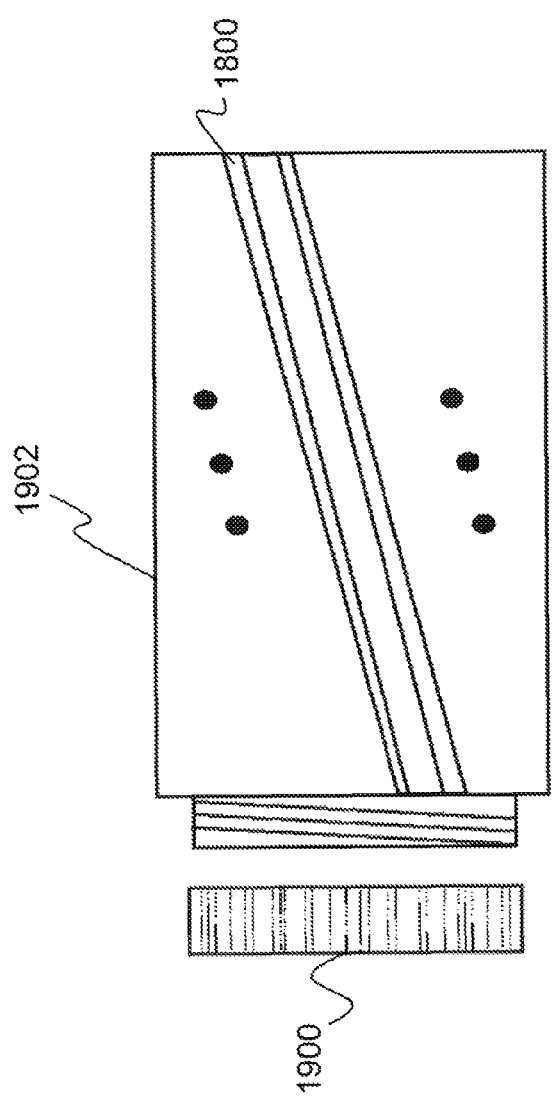
FIG. 19 is a front-view illustration of an anoxic tumbler with a removable cap according to the present invention.

Alternatively, and as shown in FIG. 19, the anoxic tumbler may comprise a removable cap 1900 which is removably connected with a hollow chamber 1902 through a thread and screw configuration. Thus, when the removable cap 1902 is positioned on the hollow chamber 1902, an enclosed chamber is formed. Furthermore, this aspects depicts indentations 1800 in another possible configuration.

The anoxic tumbler is comprised of any lightweight material (e.g., plastic) that allows the anoxic tumbler to have near neutral buoyancy. Thus, the anoxic tumblers alternatively rise to the top of the water and then submerge when subjected to currents and eddy currents in an aeration basin. The near neutral buoyancy of the anoxic tumbler creates anoxic regions within the enclosed chamber. There is minimal diffusion of oxygen due to oxygen-consuming bacteria in the aeration basin; thus, the enclosed chamber of the anoxic tumbler remains anoxic. Any number of anoxic tumblers may be added to a volume of water in an aeration basin in order to produce the desired effect. The anoxic tumblers create a plurality of anoxic regions throughout the aeration basin. Within the anoxic tumbler, an anaerobic microenvironment is created to facilitate anoxic bacterial growth and, thus, denitrification of nitrates to nitrogen gas. In contrast, an aerobic microenvironment is created around the anoxic tumbler which acts to oxidize ammonia.

In a desired aspect, the anoxic tumbler is opaque and dark in color. As non-limiting examples, the enclosed chamber of the anoxic tumbler may be dark green or grey; however, any dark color would be suitable. The purpose of having a darker, opaque enclosed chamber is to keep algae growth to a minimum and to provide an optimal environment for bacteria growth and maintenance, since bacteria prefer a dark, warm environment.

Furthermore, in one aspect, the interior region of the enclosed chamber can be filled with marbles, stones, or similar materials, to cause a stirring effect within the enclosed chamber. In another aspect, the anoxic tumbler may be formed to be stackable to facilitate efficient transportation and allow easily assembly at the point of use.

What is claimed is:

1. A system for simultaneously removing ammonia and nitrates from a liquid, the system comprising:
    a plurality of columnar units residing substantially within a single, outer volume;
    each columnar unit having a top, a bottom, and a bounding surface extending from the top to the bottom with a length, and a circumference, where the bounding surface possesses apertures located throughout the length of the bounding surface;
    wherein each columnar unit is surrounded by a cylindrical outer sheath comprising a plurality of apertures and having a circumference greater than the circumference of the columnar unit;
    wherein each cylindrical outer sheath is configured to move longitudinally along the length of the columnar unit, such that when the cylindrical outer sheath moves with respect to the columnar unit, apertures in the columnar unit either align with apertures in the cylindrical outer sheath or are concealed by the cylindrical outer sheath;
    wherein the plurality of columnar units considered together, and the outer volume considered by itself, further consist of distinct functional volumes comprising
    a nitrifying volume for the nitrification of a liquid, and a denitrifying volume for the denitrification of a volume.

2. A system as set forth in claim 1, where the nitrifying volume is a relatively oxygenated region, and the denitrifying volume is a relatively oxygen depleted region.

3. A system as set forth in claim 2, where the nitrifying volume is in communication with an aeration device for providing oxygen to create the relatively oxygenated region.

4. A system as set forth in claim 3, where one of the functionally distinct volumes is a fluid body having a bottom, where the liquid in the fluid body has a top surface, and where the other functionally distinct volume resides in the fluid body and comprises the plurality of columnar units, where the plurality of columnar units is fixed with regard to the bottom of the fluid body and the top surface of the liquid.

5. A system as set forth in claim 1, where for each columnar unit, the outer sheath is configured with a floatation device which allows for movement of the outer sheath with respect to the columnar unit for the selection of the at least one aperture when the columnar unit resides in a fluid body based on a level of a top surface of the liquid in the fluid body.

6. The system as set forth in claim 1, wherein the plurality of columnar units is fastened in the outer volume in a pattern surrounding an aeration device.

* * * * *